United States Patent [19]
Gagnon

[11] Patent Number: 5,740,031
[45] Date of Patent: Apr. 14, 1998

[54] CONTROL SYSTEM FOR THE IRRIGATION OF WATERING STATIONS

[75] Inventor: Romain Gagnon, Saint-Bruno, Canada

[73] Assignee: Smart Rain Corp. Inc., Quebec, Canada

[21] Appl. No.: 528,648

[22] Filed: Sep. 7, 1995

[51] Int. Cl.$^6$ .................................................... G05B 11/01
[52] U.S. Cl. .......................... 364/145; 239/63; 239/69; 137/78.3
[58] Field of Search ................... 364/140–146, 364/420; 239/63–66, 67–70; 340/310.01, 310.06; 137/78.1, 78.2, 78.3

[56] References Cited

U.S. PATENT DOCUMENTS

| | | |
|---|---|---|
| 2,611,643 | 9/1952 | Higgins . |
| 2,812,976 | 11/1957 | Hasenkamp . |
| 3,723,753 | 3/1973 | Davis . |
| 3,961,753 | 6/1976 | Sears . |
| 4,197,866 | 4/1980 | Neal . |
| 4,396,149 | 8/1983 | Hirsch . |
| 4,545,396 | 10/1985 | Miller et al. . |
| 4,626,984 | 12/1986 | Unruh et al. . |
| 4,760,547 | 7/1988 | Duxbury . |
| 4,771,356 | 9/1988 | Hastings ........................ 361/59 |
| 4,799,142 | 1/1989 | Waltzer et al. . |
| 4,962,522 | 10/1990 | Marian ........................ 239/70 |
| 5,021,939 | 6/1991 | Pulgiese . |
| 5,038,268 | 8/1991 | Krause et al. . |
| 5,097,861 | 3/1992 | Hopkins et al. . |
| 5,246,164 | 9/1993 | McCann et al. ............... 239/73 |
| 5,251,153 | 10/1993 | Nielsen et al. . |
| 5,337,957 | 8/1994 | Olson . |
| 5,479,338 | 12/1995 | Ericksen et al. ............ 364/145 |
| 5,546,974 | 8/1996 | Bireley ......................... 239/69 |

FOREIGN PATENT DOCUMENTS

| | | |
|---|---|---|
| 0202847 | 3/1986 | European Pat. Off. . |
| 231156 | 4/1923 | Germany . |
| 3716349 | 11/1988 | Germany . |
| 884632 | 11/1981 | U.S.S.R. . |
| 1371632 | 2/1988 | U.S.S.R. . |
| 1419612 | 8/1988 | U.S.S.R. . |
| 1604264 | 11/1990 | U.S.S.R. . |
| 1720591 | 3/1992 | U.S.S.R. . |
| WO8504120 | 9/1985 | WIPO . |
| WO8904010 | 5/1989 | WIPO . |
| WO9427734 | 12/1994 | WIPO . |

*Primary Examiner*—Paul P. Gordon
*Assistant Examiner*—Thomas E. Brown
*Attorney, Agent, or Firm*—Cushman Darby & Cushman IP Group of Pillsbury Madison & Sutro LLP

[57] ABSTRACT

An irrigation system for controlling a plurality of watering stations whereby each station is irrigated in accordance with the specific soil needs at that station; the system includes a plurality of irrigation controllers, one at each watering station, each controller including a power line transceiver, a micro-processor, an erasable non-volatile memory, and an actuating circuitry for activating a valve actuator in response to data received from a computer; a power line network powers the controllers and serves as a medium through which the controllers communicate between one another and the computer.

17 Claims, 2 Drawing Sheets

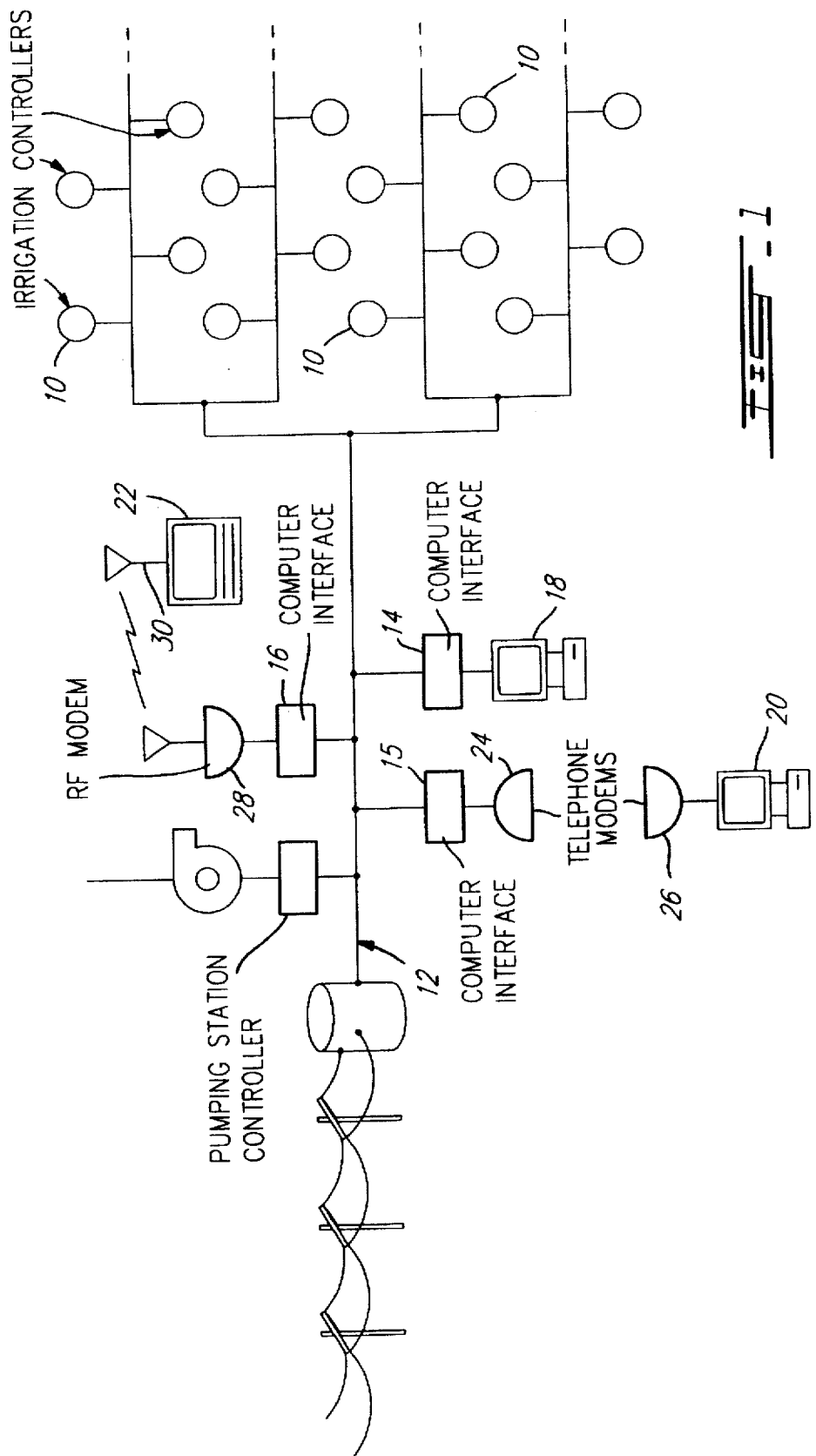

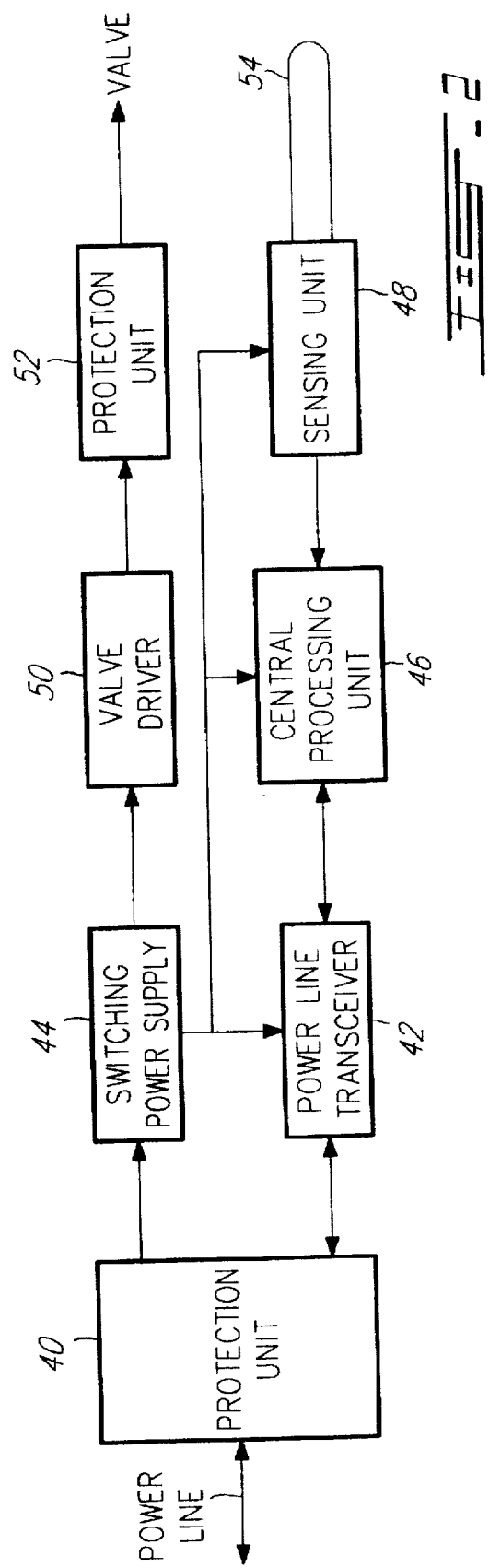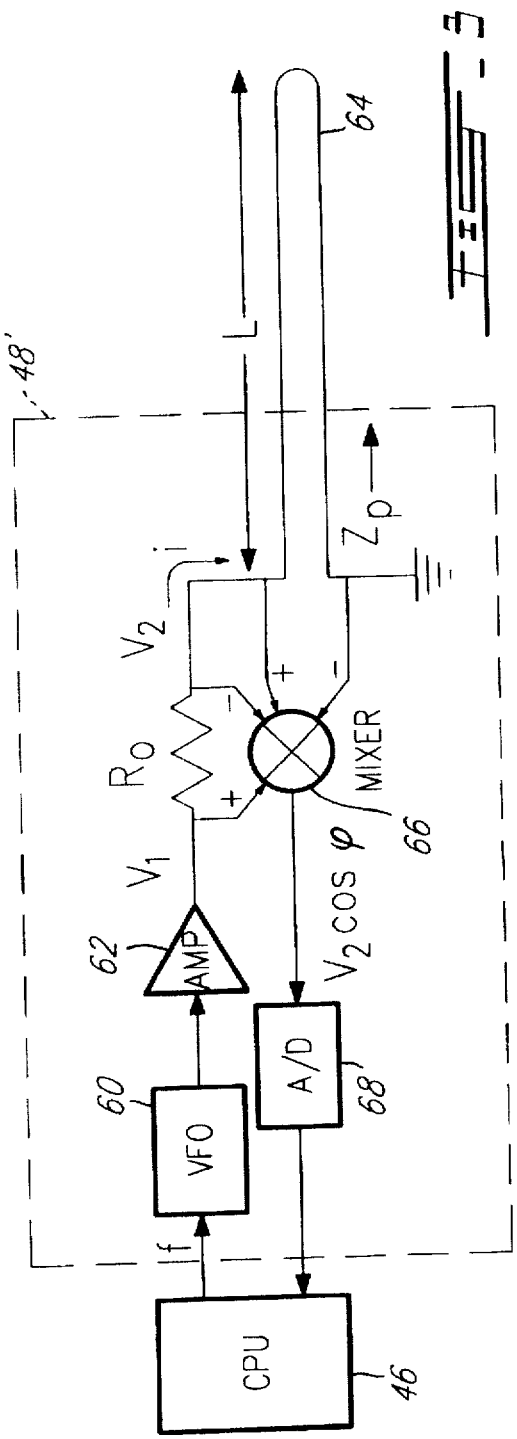

CONTROL SYSTEM FOR THE IRRIGATION OF WATERING STATIONS

FIELD OF THE INVENTION

The present invention relates to a system for controlling a plurality of watering stations whereby each station is irrigated in accordance with the specific soil needs at that stations and, more particularly, to a computer control system in which feedback from water content and salinity sensors is provided.

BACKGROUND OF THE INVENTION

Systems for automatically irrigating and/or fertilizing golf courses and other sports turf, agricultural operations, contaminated soils, and the like are well known.

Conservation of ground water by more efficient irrigation and a reduction of the pollution of these waters due to fertilizing are a constant concern to preserve the environment.

In the past, it has been common to operate irrigation systems by timing devices to carry out methods which, in fact, did not take into account the actual needs of the soil for moisture. Such devices are controllers which take care of typically 12 to 18 watering stations, each station consisting of one or few sprinklers. A typical controller requires 120 volts supply (or 220 volts in some foreign countries) and supply 24 volts AC to the valve actuator of each watering station. For instance, more than 10 controllers are most often required to cover a complete golf course of 18 holes. Since the stations are far apart, a lot of low voltage cable between the controller and its sprinkler valves must be installed in the ground, which is expensive, both to install and maintain.

Some controllers can be controlled at a distance via an extra twisted pair of cables and a personal computer. The other controllers require the user to travel on the field in order to program each controller individually.

Because of the variable topography and geometry of the irrigated fields, all watering stations do not require the same amount of watering. Therefore, the user must set a different number of minutes of watering per day for each zone according to its specific needs. The process of finding the exact number for each zone is tedious and empirical. Most likely, the user will oversize this number of minutes in order to prevent water shortage. Unfortunately, this practice will result in water waste.

Systems have been developed using various types of buried sensors to determine when the soil requires watering. Typical of such apparatus may be found described in U.S. Pat. Nos. 2,812,976 (Hasencamp), 2,611,643 (Higgins), 3,961,753 (Sears) and 4,197,866 (Mal). These systems utilize an in-ground sensor (or probe), a threshold device which will turn on the irrigation when below a certain indicated moisture level, and timers. This option is useful for adjusting watering with respect to changing meteorological conditions. However, the water content sensor reading does not provide any individual watering station, nor does it necessarily provide exact average data. Therefore, it does not relieve the user from conducting the station by station calibration described above.

Moreover, the readings from commonly used moisture sensors are greatly influenced by the salinity of the soil as well as by the moisture. Therefore, the operation of such systems will be influenced by the operator's fertilizing schedule.

One system found described in U.S. Pat. No. 4,545,396 issued Oct. 8, 1985 to Miller et al. describes a multiplicity of moisture and salinity sensors buried within the route zone of crops and includes means for measuring the complex impedance of the sensor in which the reactive part is a measure of the moisture content of the soil and the resistive part is a measure of the salinity of the soil. The system uses a digital computer which has a data bank that stores fixed parameters of the operation, such as the nature of the soil, the crop requirements for fertilizer and moisture, meteorological data, and other information useful in the control of irrigation and fertilizing. Such apparatus does not work in most soils since the reactive part of the impedance is too small at low frequencies and varies greatly from one soil to another. Moreover, it provides no efficient means for communicating the data to a central computer.

OBJECTS AND STATEMENT OF THE INVENTION

It is an object of the present invention to provide an irrigation system which overcomes the above described problems of presently known irrigation controllers. This is achieved by providing a system which essentially comprises one irrigation controller per zone, at least one computer interface, an application software and at least one microcomputer to run the software.

Therefore, the present invention pertains to an irrigation system for controlling watering stations. The watering stations are irrigated in accordance with the specific soil needs of the watering stations, and each station has valve actuating means. The irrigation system includes computer means including a stored software program for establishing irrigation schedules for the watering stations, and a plurality of irrigation controllers, one at each watering station; each the controller including a power line transceiver, a micro-processor, erasable non-volatile memory means, and an actuating circuitry for activating the valve actuating means in response to data received from the computer means. The irrigation system further includes a power line network for powering the controllers and serving as a medium through which the controllers communicate between one another and the computer means, and a computer interface for interfacing the power line network with the computer means.

The present system is based on LonWorks™ technology, developed by Echelon Corporation. All hardware modules power themselves directly from the power line. They also use the power line as a medium to communicate between each other. For this purpose, they use a LPT-20 power line transceiver and the LonTalk™ protocol developed by Echelon Corporation. Each hardware module has a Neuron™ micro-processor which not only implements the LonTalk communication protocol but also the application software, or irrigation program, written in Neuron C™.

The irrigation controller is a rugged and weatherproof device that can measure the amount of water and fertilizer in the soil and its temperature via a probe and energize the valve actuator of its irrigation zone.

The computer interface module allows communication between a personal computer and any node of the network (or hardware modules). When connected to a modem, it allows communication with a remote computer via a telephone line or radio frequencies.

The application software runs on a personal computer, such as IBM PC compatible or Macintosh, connected to the network. It displays graphically an aerial photograph or a map of the irrigated land with the water content and the fertilizer content of each individual watering station. It also allows the user to manually open or shut any valve actuator at distance without leaving the desk. The user can also program the starting time and day and watering duration of every station.

The application software can also automate irrigation and fertigation of each station based on its specific water content, fertilizer content and temperature data. It can also take into account some meteorological forecasts obtained by modem or entered at the keyboard.

Therefore, by individually optimizing the irrigation and fertilization of each watering station with respect to the specific needs of its soil, the present system saves water, fertilizer and manpower. The system of the present invention improves the quality of the grass because manual irrigation cannot reach the level of precision of a dedicated computer. Moreover, the present system will promptly report any system defect. Therefore, the defect may be repaired before the grass or crop is harmed.

In a new installation, the system of the present invention reduces costs since cabling requirements are greatly reduced and controller housings are not required. Engineering costs are also lower since the network topology is rather straight forward. Since the cabling is simpler, maintenance and troubleshooting are greatly reduced. Moreover, the present system automatically reports the position of a short circuit or open circuit in the network. The absence of controller housings also reduces the chances of lightning strike and vandalism. Finally, the failure of an irrigation controller will put only one watering station out of order.

In existing installations, one advantage of the present invention is that the existing cabling network is used for communication thus eliminating the high costs of recabling or installing RF controllers. If the existing low voltage cable can withstand higher voltage, it is connected directly to the power main. Otherwise, a transformer can be utilized to lower the voltage on the low voltage side of the network. Such an hybrid network does not harm the communication as long as the proper transformers and "jumper capacitors" are selected. As existing cabling grows older, risks of failure are prevented by the system which detects any fault and its position in the network.

Finally, the present system provides a user friendly graphical interface to the user to control irrigation.

The present invention is also concerned with a novel sensor for measuring the permittivity and the conductivity of the soil, which comprises:

a probe adapted to be buried in the soil to be measured and consisting of two parallel metallic rods, oscillator means for feeding a high frequency sinusoidal signal to the probe and mixer means for measuring the electrical resistance between the rods at any frequency generated by the oscillator means. The sensor also includes a micro-processor for computing permittivity as a function of the frequency at which the electrical resistance is maximum or minimum and computing conductivity as a function of the minimum and maximum values of the resistance.

circuit means for allowing the micro-processor to vary the frequency generated by the oscillator means and to read the resistance value measured by the mixer means, and means for communicating permittivity and conductivity data to display or monitor means.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 illustrates the topology of a typical network using the system of the present invention;

FIG. 2 is a block diagram of an irrigation controller; and

FIG. 3 illustrates a block diagram of a sensor unit used in the present system.

DESCRIPTION OF PREFERRED EMBODIMENTS

FIG. 1 illustrates the topology of a typical network using the system of the present invention. A free-topology power line network is displayed consisting of a plurality of watering stations each including an irrigation controller 10, the controller being powered from a 120 V, 220 V or 24 V power line 12. To this power line 12 is connected one or more computer interfaces 14, 15, 16 which are respectively connected to computers 18, 20 and 22, either directly as in the case of the main computer 18 or through telephone modems 24 and 26 in the case of the remote computer 20 or the radio frequency modems 28 and 30 in the case of the portable computer 22. Also connected to the power line 12 is a pumping station controller 32.

Each irrigation controller 10 is housed in a water proof casing and can be buried in the ground. This irrigation controller must operate in a wide range of temperature, typically from −40° C. to +50° C. The irrigation controller is protected against indirect lightning and includes a probe for sensing water content, fertilizer content and temperature of the soil. It is provided with a first pair of wires for connection to the power line and a second pair of wires for connection to a valve (not shown) which will actuate the irrigation of the station.

Referring to FIG. 2, each irrigation controller 10 comprises a power line protection unit 40 protecting the irrigation controller against voltage surges (differential and common mode) mainly due to lightening which are frequent in open field, especially in certain areas. This protection may be achieved by using metal-oxide varistors and tranzorbs. The power line protection must protect the network against a failure of the irrigation controller by limiting current sunk using a PTC, for example, at the input. The protection unit decouples the power supply using a choke in order to increase the input impedance of the irrigation controller at communicating frequencies in order to improve the signal strength. It also filters electromagnetic interference caused by the switching power supply for preventing interference with communication signals and for complying with electromagnetic interference emission regulations.

The power line transceiver 42 allows the irrigation controller to communicate, e.i. to transmit and to receive, with other irrigation controllers and computer interfaces. The transceiver modulates the power line at high frequency for communication, for example 132.5 Khz. It tolerates strong signal attenuation typically 70 dB, and uses approved equipment and protocol, typically Echelon Corp. PLT-20 transceiver and LonTalk protocol compliant with CENELEC EN50065-1. The transceiver works in a free-topology network which allows retrofitting easily existing hybrid low-high voltage cable networks and saving on cabling in new installations.

Each irrigation controller also includes a switching power supply 44, a central processing unit 46 and a sensing unit 48.

The switching power supply 44 generates power for the transceiver 42, typically 5 and 9 volts. It generates power for the central processing unit 46 and the sensing unit 48. It may generate 24 volts DC for the inverter circuit (whenever present) of the valve driver 50, typically 1 amp. The power supply is switching for reducing size and heat loss; its switching frequency is typically higher than communication frequency to prevent harmonics interference; for example, its frequency may be 200 KHz. The power supply primary and secondaries are isolated for security and to prevent current loops through the ground. The power supply may accept wide input voltage range, typically 85 to 250 volts or 24 volts, AC or DC, 50 or 60 Hz. This range is compatible with both European and American power lines and low voltage networks; it tolerates important voltage drops to thereby allow smaller power cabling and related savings.

Each irrigation controller further includes a valve driver 50 which detects open and short circuit conditions. It may consist of an inverter which generates a square wave of 24 volts AC or 24 volts DC for powering the valve solenoid whose frequency (50 or 60 Hz) is programmable. Or, the valve driver may consist of an opto-isolated TRIAC, especially when the irrigation controller is supplied with 24 VAC.

The sensing unit 48 measures the permittivity and conductivity of the soil for determining water and fertilizer content by feeding a high frequency sinusoidal to a probe 54, varying its frequency and measuring the resistance of the probe in respect to the signal frequency. The sensing unit also measures the temperature of the soil using a thermistor located in the soil probe.

Each irrigation controller 10 comprises also a valve end protection unit 52 which will protect the irrigation controller against too high current or short circuit using PCTs. It will also protect the irrigation controller against inadvertently plugging the valve output to the power line. Finally, this unit also protects the irrigation controller against voltage surges.

The central processing unit 46 contains a micro-controller that handles communication protocol and inputs/outputs using a "Neuron" chip made by Echelon Corporation. It contains PROM and/or EPROM (typically flash EPROM) for storing firmware, irrigation schedules, historical data and user's setpoints. It has a unique fixed communication address plus a programmable address. The firmware can be partially or totally downloaded remotely for upgrading purposes, if flash EPROM option is present. This unit may include a real time clock with battery back-up for keeping time and day and broadcast them on the network; otherwise, it updates its time and day from the network. The unit also generates an alarm if the temperature of the soil, permittivity, conductivity or valve current go outside a specified range. It will shut off the valve if the current gets too high or temperature too low. The irrigation controller acts as an intelligent repeater for allowing the computer to communicate with another irrigation controller which it can not communicate directly with, because of signal attenuation and/or reflection. The processing unit 46 will process permittivity and conductivity of the soil to determine water and fertilizer content. It will also process the thermistance resistance to determine the temperature of the soil. Finally, it will operate the valve based on a programmed and downloaded irrigation schedule and/or based on water content, fertilizer content and/or temperature of the soil.

The computer interfaces 14, 15 and 16 interface the serial ports of the computers with the power line network or plug directly into the computer bus; they allow the user to control the network from a computer. It contains the same transceiver and micro-processor than the irrigation controller and it implements the same communication protocol. The computer interface may contain a real time clock for periodically broadcasting time and day to the entire network and synchronize irrigation schedules. It may contain flash EPROM for storing the irrigation schedules and controlling the network while the computer is turned off.

Each computer 18, 20 or 22 and its software allow the full and centralized control of the irrigation system via a user friendly graphical interface. It contains a low level driver for implementing the communication protocol, typically LonTalk, and for communicating with an irrigation controller on the power line network. The computer displays a colour map of the irrigated field, the sprinklers and pipes and show graphically the different levels of water content, fertilizer content or temperature of the soil. It will allow to manually open or shut any valve in the field and it will allow to program any number of irrigation schedules. The computer can automatically irrigate the field based on temperature data, water and fertilizer content data and user's setpoints without the need for human intervention; it optimizes irrigation schedules based on the flow capacity of each watering station, main pipe and pumping station. The computer may use a modem to get meteorological forecast data to optimize the irrigation process. The computer detects instantly and locates any damaged cable in the field whether it is a power line cable or a valve cable. The computer may also use an irrigation controller as a repeater in order to reach another one which it can not communicate with directly because of signal attenuation or reflection. It will also interface with the pumping station controller 32 if one is used.

If used, the pumping station controller 32 has a set of input and output ports, some digital and some analogue (4–20 ma or 0-10VDC) for controlling partially or totally a pumping station (not shown). The controller 32 will communicate over the power line network via the same transceiver and protocol and it will allow the irrigation software to control the pumping station and monitor its status. The controller will also allow automatic fertigation by energizing one or more injection pumps which will inject liquid fertilizer into the irrigation water. This controller normally will reside in the pumping station building.

Referring to FIG. 3, an improved sensing unit 48' is illustrated. It comprises a variable frequency oscillator 60 that generates a sinusoidal signal at a high frequency f specified by the micro-processor of the central processing unit 46, typically from 50 to 225 MH$_z$. An RF amplifier 62 may amplify this signal generated by the oscillator and feed it to a U-shaped probe 64 via a resistor $R_o$. The probe is a tube made of stainless steel that acts as a transmission line. It is buried in the soil where permittively and conductivity are measured. A thermistor (not shown) is inserted at the end of the probe 64 in order to measure the temperature of the soil. A mixer 66 multiplies the voltage $V_2$ across the probe by cosinus $\phi$, where $\phi$ is the angle between $V_2$ and the current I flowing through the probe. The analogue to digital converter 68 converts $V_2 \cos \phi$ in digital format readable by the micro-processor.

The velocity of waves propagating through the probe depends on the permittivity $\epsilon$ of the soil in which it is buried and slightly on its conductivity G. A sinusoidal signal generated by the VFO will travel through the probe in the forward direction at a specific velocity, will be inverted and reflected at its end, and then will travel back in the reverse direction at the same speed, creating standing waves. The plot of $V_2$ against f would roughly look as a sinus. When the length of the probe is an odd multiple of one fourth of the wave length of the signal, the resistance of probe $R_p$ and $V_2$ are maximum; when it is an even multiple, $R_p$ and $V_2$ are minimum. On the other hand, the more conductive the soil is, the more attenuated the reflected wave and standing waves will be. Therefore, the conductivity G can be computed by the microprocessor as a function of the minimum and maximum values of $R_p$. The permittivity can be computed as a function of both G and the frequencies f at which these minima and maxima occur.

Although the invention has been described above in relation to one specific mode, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. An irrigation system for controlling a plurality of irrigating stations whereby each said irrigation station is irrigated in accordance with its soil needs for irrigation, each said irrigation station including valve actuating means, said irrigation system comprising:

a) computer means including display means for displaying the soil needs for irrigation and the water content measured from each irrigation station, said computer means establishing irrigation schedules for said irrigation stations;

b) a plurality of irrigation controllers, one at each of said irrigation stations, each said irrigation controller comprising:

a power line protection unit being coupled to a power line network;

a power line transceiver and a power supply being coupled to said power line protection unit;

sensing means for collecting soil data including soil water content to measure the soil needs for irrigation and permittivity of the soil using a probe attached to said sensing unit and buried in soil at said irrigation station;

a micro-processor being coupled to said power line transceiver and said sensing means, said microprocessor including a stored firmware program to independently control said valve actuating means based on said irrigation schedules downloaded from said computer means and said soil data collected by said sensing means;

an actuating circuitry, coupled to said micro-processor, for activating said valve actuating means; and a valve end protection unit connected to said actuating circuitry, wherein said power supply feeds low voltage direct current to said micro-processor, said power line transceiver, said sensing means and said actuating circuitry;

c) said power line network for supplying power to said irrigation controllers and said valve actuating means and acting as a two-way communication medium through which said irrigation controllers communicate between one another and said computer means; and d) a computer interface for interfacing said power line network with said computer means.

2. An irrigation system as defined in claim 1, wherein said stored firmwave program enables said irrigation controller to act as an intelligent repeater to allow said computer means to communicate with another irrigation controller with which said computer means cannot communicate directly.

3. An irrigation system as defined in claim 1, wherein said computer means is in constant communication with each of said irrigation controllers;

said computer means reports a communication loss with any of said irrigation controllers in real time;

said soil data collected by said sensing means are transmitted in real time to said computer means;

said soil needs for irrigation are displayed in real time;

critical data includes valve state and immediate irrigation command being transmitted instantaneously through said power line network; and said critical data transmission acknowledged or otherwise retransmitted.

4. An irrigation system as defined in claim 1, wherein said stored firmware program is updatable from said computer means through said power line network.

5. An irrigation system as defined in claim 1, wherein said sensing means makes measurements using high frequency signals.

6. An irrigation system as defined in claim 1, wherein said probe is rugged and weatherproof.

7. An irrigation system as defined in claim 1, wherein said actuating circuitry operates in ac mode or dc mode;

said actuating circuitry includes an inverter for converting said low voltage direct current into an alternating current to supply power to said valve actuating means of said irrigation station when operating in ac mode; and an output port of said actuating circuitry is connected to a pair of wires isolated from said power line network.

8. An irrigation system as defined in claim 1, wherein said irrigation system operates on LonWorks technology and communicates using LonTalk protocol and said microprocessor being a Neuron processor.

9. An irrigation system as defined in claim 1, wherein said soil data further include soil salinity data and wherein at least one of said irrigation controllers includes means for measuring the salinity of soil;

said sensing means measures the conductivity of the soil; and said display means displays the salinity measured at said at least one irrigating station.

10. An irrigation system as defined in claim 9, wherein said sensing means measures the conductivity of the soil using said probe.

11. An irrigation system as defined in claim 1, wherein said soil data further include soil temperature and wherein each said irrigation controller includes means measuring the soil temperature; and said display means displays the soil temperature measured from each of said irrigating stations.

12. An irrigation system as defined in claim 9, further comprises a pumping station controller connected to said power line network and communicates with said irrigation controllers and said computer means through said power line network; and said pumping station controller includes means for adding one or more liquid fertilizers to irrigation water at said irrigation stations.

13. An irrigation system as defined in claim 12, a stored program in said computer means adapted to automate irrigation, fertigation and chemigation schedules of each said irrigation stations based on soil requirements on predefined engineering constraints and on user-defined constraints to minimize energy, water, fertilizer usage and manpower.

14. An irrigation system as defined in claim 1, wherein said computer interface communicates with said computer means via a modem.

15. An irrigation system as defined in claim 1, wherein said sensing means comprises:

a) said probe being adapted to the buried in the soil to be measured, said probe including two parallel metallic rods;

b) oscillator means for feeding a high frequency sinusoidal signal to said probe;

c) means for measuring the electrical resistance across said rods at any frequency generated by said oscillator means;

d) circuit means allowing said micro-processor to vary said high frequency sinusoidal signal and to read said resistance; and e) software means for computing permittivity as a function of the frequency at which said resistance is maximum and minimum and computing said conductivity as a function of the minima and maxima values of said resistance.

16. An irrigation system as defined in claim 15, wherein said means for measuring the resistance across said rods includes a resistance component connected between said oscillator means and said probe, a mixer multiplying the voltage across said rods with the voltage across said resistance component, and a low-pass filter filtering out the high frequency component of the multiplication.

17. An irrigation system as defined in claim 16, further comprising means for measuring the output voltage of said oscillator means, means measuring said voltage across said rods, said circuit means allowing said micro-processor to read said voltages; and said software means for computing said conductivity as a function of the minima and maxima values of said resistance across said rods and said voltages.

* * * * *